Figure 1:
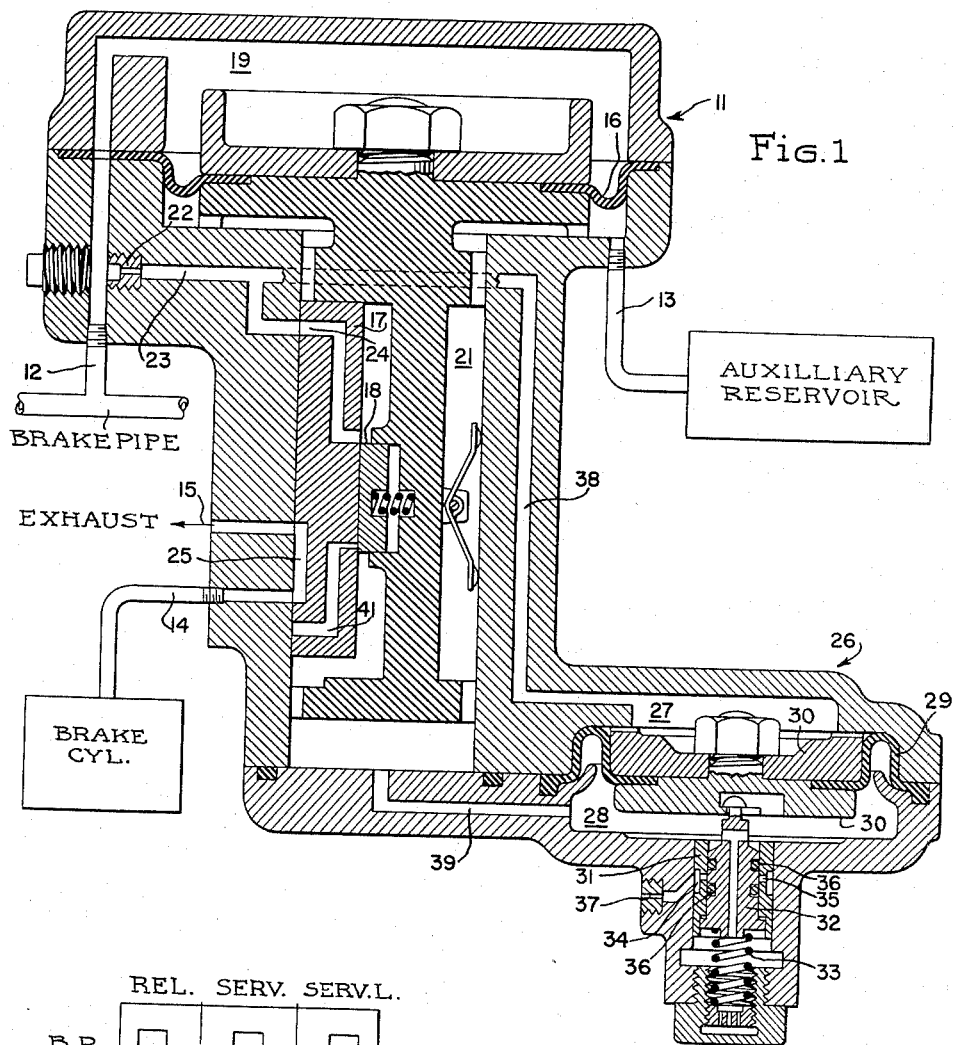

June 7, 1960

L. I. PICKERT 2,939,746

RELEASE-INSURING VALVE FOR AIR BRAKES

Filed Aug. 20, 1957

INVENTOR
Lynn I. Pickert

BY

ATTORNEYS

United States Patent Office 2,939,746
Patented June 7, 1960

2,939,746
RELEASE-INSURING VALVE FOR AIR BRAKES

Lynn I. Pickert, Watertown, N.Y., assignor to The New York Air Brake Company, a corporation of New Jersey Filed Aug. 20, 1957, Ser. No. 679,240

4 Claims. (Cl. 303—70)

This invention relates to triple valves for automatic air brakes and particularly to related release-insuring valves of the type which serve to vent the slide valve chamber and the connected auxiliary reservoir to accelerate releasing motion whenever the triple valve is urged in a releasing direction, and moves sluggishly or not at all, in response to a brake-releasing rise of brake pipe pressure.

The present trend in air brake control valves is toward the use of diaphragms to replace the ring-packed pistons commonly used to operate the triple valve and the release-insuring valve. This had led to constructions in which a restricted charging port leads through the slide valve of the triple valve.

By leading the charging passage from the brake pipe to the charging port in the slide valve first through a local restrictor and then through a passage of small volume, and by using the pressure in this small-volume passage to control the release-insuring valve, great sensitivity and accelerated action are attained.

Because this arrangement requires no new port in the triple slide valve, it offers manufacturing economy even in triple valves of basic simplicity. In complicated valves it frees the design of the slide valve from added complication. The device is economical in the use of air, impairs none of the functions of the triple valve, and introduces no new element of risk.

An important feature of the present release-insuring valve is that the diaphragm which is connected to operate this valve is subject to a high pressure differential only in one direction. This high differential acts in the valve closing direction, and is the difference between auxiliary reservoir pressure and brake pipe pressure which exists during the initial stages of a normal service application and throughout the duration of an emergency application. This feature is significant, because the release-insuring valve's diaphragm must be relatively thin and flexible in order that the necessary sensitivity for effective operation can be achieved. The diaphragm of the release-insuring valve of the present invention is never subject to pressure differential, in the valve opening direction, larger than the differential necessary to move the slide valve to release position. Thus the diaphragm assembly can be easily designed so that it will withstand the high pressure differential acting in the valve closing direction and still have the required sensitivity of operation in response to pressure differential acting in the opposite direction.

The invention will now be described by reference to the accompanying drawing, in which:

Fig. 1 is an axial section of a triple valve embodying the invention. The view is drawn as if all ports lay on the plane of section, according to a familiar convention. More compact commercial port arrangements are possible.

Figure 2:
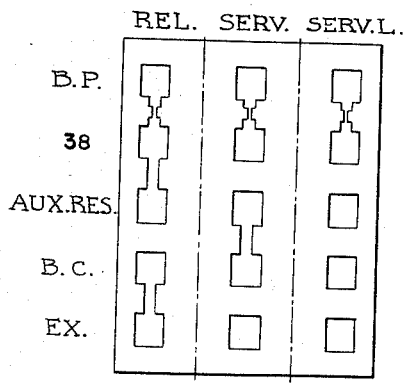

Fig. 2 is a simplified schematic diagram showing the port connections established by the slide valve of the triple valve shown in Fig. 1 in each of its operative positions.

Referring to Fig. 1, there is shown a triple valve generally indicated at 11. It has the usual brake pipe connection 12, auxiliary reservoir connection 13, brake cylinder connection 14 and exhaust connection 15. The valve device includes a diaphragm 16 operatively connected to control the movement of a slide valve 17 and its associated graduating valve 18. The working space 19 and valve chamber 21, on opposite faces of the diaphragm 16, are in open communication, respectively, with the brake pipe and with the auxiliary reservoir through the connections 12 and 13.

In the illustrated release position, the brake pipe connection 12 communicates with the valve chamber 21 by way of a restriction 22, a passage 23, of relatively small volume, in the triple valve housing, and a passage 24 in the slide valve which registers with the passage 23 when the valve is in release position. The brake cylinder is connected through the cavity 25, in the slide valve 17, to the exhaust connection 15.

Provided in an extension of the triple valve housing is a release-insuring valve 26. A double-acting motor is connected with the release-insuring valve to operate it. This motor comprises an annular slack diaphragm 29 clamped at its outer periphery between the opposed portions of the housing and clamped at its inner periphery between opposed clamping discs 30. Clamping discs 30 are connected with the valve stem, as shown. The motor includes two working spaces, namely, a controlling chamber 27 and a controlled chamber 28. Extending outward from the controlled chamber 28 is a bore into which is pressed a valve seat bushing 31. Reciprocable in the bushing 31 is an axially ported vent valve member 32 which is connected to be moved by the diaphragm 29. A spring 33 biases the valve 32 to its closed position illustrated in Fig. 1. The valve seat bushing 31 is encircled by an annular recess 34. A series of radial ports 35 extend inward from the recess 34 through the bushing 31. The vent valve member 32 includes two encircling grooves in which sealing rings 36 are mounted. In the closed position of the vent valve, they are respectively above and below the radial ports 35. These sealing rings 36 prevent leakage between the valve 32 and the bushing 31. A restricted exhaust port 37 communicates with the annular recess 34.

A branch line 38 extends from the controlling chamber 27 to the charging connection 23. It communicates with the charging connection 23 between the restriction 22 and the seat of the slide valve 17. The controlled chamber 28 communicates with the slide-valve chamber 21 through a passage 39. Since the slide-valve chamber 21 is in open communication with the auxiliary reservoir by way of the passage 13, the chamber 28 is always charged with pressure fluid at auxiliary reservoir pressure.

The triple valve is shifted to service position when the brake pipe pressure is reduced at an initial rate greater than the rate of back flow through the restriction 22. Under these conditions, pressure in the valve chamber 21 will be higher than the pressure in the working space 19 and will shift the diaphragm 16 and the graduating valve 18 upward, so that the passage 24 is lapped by the graduating valve 18, terminating flow through that passage. Upon continued movement of the diaphragm 16, the slide valve 17 is shifted to application position in which the brake cylinder port 14 is placed in communication with the slide-valve chamber 21 by means of the passage 41 in the slide valve 17. This is the service position of the valve and is diagrammatically indicated in Fig. 2 under the legend "SERV."

In this position the brake cylinder, which had been vented when the triple valve was in release position, receives pressure fluid from the auxiliary reservoir. This flow of pressure fluid will cease when the pressures in the reservoir and the brake cylinder equalize or when it is terminated by shift of the graduating valve 18 to lap passage 41. Movement of the slide valve to service position severed the connection between ports 23 and 24, whereupon the pressure in chamber 27 would equalize with brake pipe pressure through the restriction 22.

The pressure in the auxiliary reservoir during a light service application will drop below brake pipe pressure. This will cause the diaphragm 16 to move downward, moving the graduating valve 18 but not the slide valve 17. Movement of the graduating valve 18 closes passage 41. This is service lap position of the valve and is illustrated diagrammatically in Fig. 2 under the legend "SERV. L."

To release the brakes, the engineer's brake valve (not shown) is moved to a position in which brake pipe pressure is restored. Development of brake pipe pressure is accompanied by rising pressure in the working space 19 which, in the ordinary operation of the valve, will cause the diaphragm 16 to move downward, causing the graduating valve 18 and slide valve 17 to resume their illustrated positions in which the brake cylinder is vented and the auxiliary reservoir is connected to be recharged from the brake pipe 12.

If the slide valve fails to shift in response to rising brake pipe pressure, the increasing pressure difference between brake pipe pressure and auxiliary reservoir pressure effective in the chambers 27 and 28, respectively, will cause the diaphragm 29 to move downward against the bias of the spring 33, thereby shifting the vent valve 32 to a position in which the radial ports 35 are uncovered and pressure fluid from chamber 28 and from the auxiliary reservoir which communicates freely therewith, is vented to atmosphere through the restricted port 37.

The effect of this is to produce quickly an increasing differential between the pressures in the working chamber 19 and in the slide-valve chamber 21. Thus, an abnormally large restoring force is exerted on the diaphragm 16 and insures that the slide-valve will move to release position. When the parts reach release position with the restricted vent 37 open, the pressures in the chambers 27 and 28 will equalize rapidly, since they are now in open communication with one another through the passages 38, 23, 24 and 39. This pressure equalization permits the spring 33 to return the vent valve 32 to its normal closed position.

One of the advantages of the present invention is the fact that the pressures in the working spaces 27 and 28 are quickly equalized when a sluggish triple valve moves in response to operation of the release-insuring valve. As a consequence, a minimum amount of air is dissipated from the auxiliary reservoir. In long freight trains, such as are in every day service, it is important that there be no unnecessary loss of compressed air.

An additional important advantage of the present invention is the fact that no added ports are required in the slide-valve. This saves manufacturing expense and, in certain relatively complex triple valves, permits incorporation of the invention without radical re-design of the slide-valve.

While the invention has been illustrated and described in conjunction with a triple valve of the simplest form, it will be understood that its usefulness is not limited to this specific valve. No limitation to use with this valve is intended and no limitation to use with any particular triple valve should be inferred, except as is expressed in the appended claims.

What is claimed is:

1. The combination of an automatic brake-controlling valve device of the triple valve type, including a brake pipe connection, an auxiliary reservoir, a double-acting motor having two working spaces one communicating with said connection and the other in open communication with said reservoir, a slide valve operated by said motor, and a reservoir-charging connection extending from said brake pipe connection and controlled by said slide valve so that it is open in the release position of the triple valve and closed in the application position of the triple valve, a restriction in said charging connection at a point between the brake pipe connection and said slide valve; a second motor comprising a movable abutment, and means enclosing first and second working spaces separated from one another by said abutment; means affording continuous communication between said first working space and said reservoir; means affording continuous communication between the second working space and said charging connection at a point between said restriction and the slide valve; means defining an exhaust passage communicating with said first working space and said reservoir; a vent valve connected to be operated by said second motor and controlling said exhaust passage; and means biasing said vent valve in its closing direction, said second motor serving to open the vent valve when pressure in said second working space exceeds the pressure in the first working space sufficiently to overpower said biasing means.

2. The combination of an automatic brake-controlling valve device of the triple valve type, including a brake pipe connection, an auxiliary reservoir, a double-acting motor having two working spaces, one communicating with said connection and the other in open communication with said reservoir, a slide valve operated by said motor, and a reservoir charging connection extending from said brake pipe connection and controlled by said slide valve so that it is open in the release position of the triple valve and closed in the application position of the triple valve, a restriction in said charging connection at a point between the brake pipe connection and said slide valve; means defining an exhaust passage from said reservoir; a vent valve controlling said exhaust passage; means imposing a bias on said vent valve and urging it in a closing direction; and a second double-acting motor operatively connected with said vent valve, continuously subject to, and urged in a valve-closing direction by auxiliary reservoir pressure, and continuously subject to, and urged in a valve-opening direction by the pressure existing in said charging connection at a point between said restriction and the slide valve, said motor being effective to overpower said bias and open said vent valve when the difference between said pressures exceeds a predetermined amount.

3. The combination of an automatic brake-controlling valve device of the triple valve type, including a brake pipe connection, an auxiliary reservoir, a double-acting motor having two working spaces one communicating with said connection and the other in open communication with said reservoir, a slide valve operated by said motor, and a reservoir-charging connection extending from said brake pipe connection and controlled by said slide valve so that it is open in the release position of the triple valve and closed in the application position of the triple valve, a restriction in said charging connection at a point between the brake pipe connection and said slide valve; and a second motor means comprising a two-part housing, a slack annular diaphragm clamped at its outer periphery between the parts of said housing, opposed clamping members clamping said diaphragm at its inner periphery, said clamping members and said diaphragm separating two working spaces, namely a first working space in continuous communication with said reservoir and a second working space in continuous communication with said charging connection at a point between said restriction and said slide valve; means defining an exhaust passage from said reservoir; a vent valve controlling said exhaust passage and connected with said clamping members; means biasing said vent valve in a valve-closing direction, said second motor means serving to open the vent valve when pressure in the second working space exceeds the pressure in the first working space by more than a predetermined amount.

4. In an automatic brake-controlling valve device of the triple valve type, the combination of a brake pipe, an auxiliary reservoir, a slide valve having alternative release and application positions, and a pressure motor for operating said slide valve between said positions; a second pressure motor having two working spaces; connections for subjecting the first-named pressure motor continuously to the opposing pressures in said auxiliary reservoir and in said brake pipe; a reservoir-charging passage extending from said brake pipe and controlled by the slide valve; a restriction in said reservoir-charging passage; a branch connection leading from the first working space of the second motor to the reservoir-charging connection at a point between the restriction and the slide valve, means for subjecting the second working space of the second motor continuously to auxiliary reservoir pressure, said slide valve being effective to establish two different flow paths, namely one effective in application position in which the branch connection is subject to the pressure in said brake pipe and a second path effective in the release position in which the branch connection is subject to the pressure in the auxiliary reservoir; a valve for venting air from said reservoir, means biasing the last-named valve toward its closed position; and connections through which the second pressure motor opens the last-named valve when the pressure in its first working space is predominant.

References Cited in the file of this patent

UNITED STATES PATENTS

| | | |
|---|---|---|
| 907,199 | Turner | Dec. 22, 1908 |
| 2,034,288 | Farmer | Mar. 17, 1936 |

FOREIGN PATENTS

| | | |
|---|---|---|
| 747,217 | France | June 13, 1933 |